United States Patent
Scalora et al.

(10) Patent No.: US 7,761,367 B1
(45) Date of Patent: Jul. 20, 2010

(54) METHOD AND SYSTEM FOR FINANCIALLY MONITORING AN ORDER

(75) Inventors: Michael Amore Scalora, Orem, UT (US); Brian Keoki Andrus, Spanish Fork, UT (US); David Audley Duncan, Orem, UT (US)

(73) Assignee: Intuit Inc., Mountain View, CA (US)

( * ) Notice: Subject to any disclaimer, the term of this patent is extended or adjusted under 35 U.S.C. 154(b) by 305 days.

(21) Appl. No.: 11/493,234

(22) Filed: Jul. 25, 2006

(51) Int. Cl.
*G06Q 40/00* (2006.01)
(52) U.S. Cl. .................. 705/37; 705/35; 707/503
(58) Field of Classification Search ............ 705/35, 705/28; 707/503, 504, 505, 506, 508–509
See application file for complete search history.

(56) References Cited

U.S. PATENT DOCUMENTS

| | | | | |
|---|---|---|---|---|
| 6,138,130 A | * | 10/2000 | Adler et al. | 715/210 |
| 2003/0220830 A1 | * | 11/2003 | Myr | 705/10 |
| 2004/0044602 A1 | * | 3/2004 | Batur et al. | 705/34 |
| 2004/0153394 A1 | * | 8/2004 | West et al. | 705/37 |
| 2005/0055275 A1 | * | 3/2005 | Newman et al. | 705/14 |
| 2007/0005481 A1 | * | 1/2007 | Kedia et al. | 705/37 |

OTHER PUBLICATIONS

Michael Rotschild, Price for Profit, Not Margin. Metal Producing & Processing. May/Jun. 2004 vol. 42, Iss. 3; p. 36, (Profit1).*
Benson P. Shapiro et al, Manage Customers for profits (not just sales). Harvard Business Review. Sep./Oct. 1987, vol. 65 Issue 5, p. 101-108, (Profits2).*

* cited by examiner

*Primary Examiner*—James P Trammell
*Assistant Examiner*—Chika Ojiaku
(74) *Attorney, Agent, or Firm*—Osha • Liang LLP (57) ABSTRACT

A method for financially monitoring an order that includes inserting an initial price of a product on an order form, displaying an initial projected profit indicator on the order form, wherein the initial projected profit indicator identifies an initial projected profit, and wherein the initial projected profit is calculated for the product using the initial price, and submitting the order form to initiate the order when the initial projected profit complies with a predefined regulation.

22 Claims, 6 Drawing Sheets

METHOD AND SYSTEM FOR FINANCIALLY MONITORING AN ORDER

BACKGROUND

Businesses that produce and sell a product, such as a good or service, are often composed of multiple departments. Each department may be responsible for a particular aspect of producing and selling the product. For example, a business that sells office chairs may have a department that designs the office chairs, a department that purchases the raw materials (e.g., screws, plastic, fabric, etc.) for the office chairs, a department that manufactures the office chairs, a department that sells the office chairs, and a financial department that ensures that the business is profitable. The division of the workload allows each employee to specialize in an aspect of the producing and selling of the product, thereby ensuring that the business is financially viable.

The purchasing department and sales department of a business have a particular impact on the financial viability of the business. For example, in the purchasing department, the profit that is obtained from selling a product is at least partially dependent on the raw materials required to manufacture the product. Specifically, if the purchasing department does not negotiate well with wholesalers, then either the product must be sold at a higher price or the profit of the business decreases. Therefore, if a contract for the product is signed before the raw materials are obtained to create the product, then the profit of the product is directly dependent on the amount that the business must pay for the raw materials.

Similarly, a sales department often has authority to negotiate with clients. For example, salespeople that work on commission may be given a percentage of the net profit of a sale, the amount of the sale above a certain minimum, etc. Thus, a salesperson may have an incentive to sell the product with a higher purchase price. Conversely, if a potential customer will not purchase the product at a set initial purchase price, then the salesperson may offer a lower purchase price in order to entice the customer.

Typically, at the end of the quarter, a business has a financial department review the costs and sales of the product in order to determine the profitability of the selling the product. If the product is not profitable, then the business may decide to stop selling the product, change in personnel, sell the product at a higher price, change the wholesalers, etc.

SUMMARY

In general, in one aspect, the invention relates to a method for financially monitoring an order that includes inserting an initial price of a product on an order form, displaying an initial projected profit indicator on the order form, wherein the initial projected profit indicator identifies an initial projected profit, and wherein the initial projected profit is calculated for the product using the initial price, and submitting the order form to initiate the order when the initial projected profit complies with a predefined regulation.

In general, in one aspect, the invention relates to a system for financially monitoring an order that includes an order form configured to receive an initial price of a product on an order form, and display an initial projected profit indicator, wherein the initial projected profit indicator identifies an initial projected profit. The system also includes an a profit evaluator configured to calculate the initial projected profit for the product using the initial price, wherein the order form is submitted to initiate the order when the initial projected profit complies with a predefined regulation.

In general, in one aspect, the invention relates to a graphical user interface for financially monitoring an order that includes an order form configured to receive an initial price of a product on the order form, an initial projected profit indicator displayed within the order form, wherein the initial projected profit indicator identifies an initial projected profit using the initial price of the product, wherein the order form is submitted to initiate the order when the initial projected profit complies with a predefined regulation.

In general, in one aspect, the invention relates to a computer program product for financially monitoring an order that includes computer readable program code that includes instructions for inserting an initial price of a product on an order form, displaying an initial projected profit indicator on the order form, wherein the initial projected profit indicator identifies an initial projected profit, and wherein the initial projected profit is calculated for the product using the initial price, and submitting the order form to initiate the order when the initial projected profit complies with a predefined regulation.

In general, in one aspect, the invention relates to a method for financially monitoring an order that includes inserting an initial price of a component of a product on an order form, displaying an initial projected profit indicator on the order form, wherein the initial projected profit indicator identifies an initial projected profit, and wherein the initial projected profit is calculated for the product using the initial price, and submitting the order form to initiate the order of the component when the initial projected profit complies with a predefined regulation.

Other aspects of the invention will be apparent from the following description and the appended claims.

DETAILED DESCRIPTION

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide a method and system for financially monitoring an order while the order is being created. In one or more embodiments of the invention, an order corresponds to a contract for exchanging money for a product. Specifically, embodiments of the invention provide an profitability analysis of an order while on a networked computer system (i.e., online). More specifically, embodiments of the invention have a profitability indicator that indicates the profitability of buying or selling a particular product or component of a product. A product corresponds to any type of good (e.g., merchandise, building, etc.) or service (e.g., legal services, contractors, hard drive space at an Internet Service Provider, installation of a good, network bandwidth at an ISP, etc.). A component of a product corresponds to raw material from which the product is created. For example, a component of the product may correspond to a portion of a product that is to be assembled with other components to create a product, a large quantity from which the single product is to be extracted, the product that is to be resold, etc. Further, embodiments of the invention indicate the profitability of the order.

Figure 1:
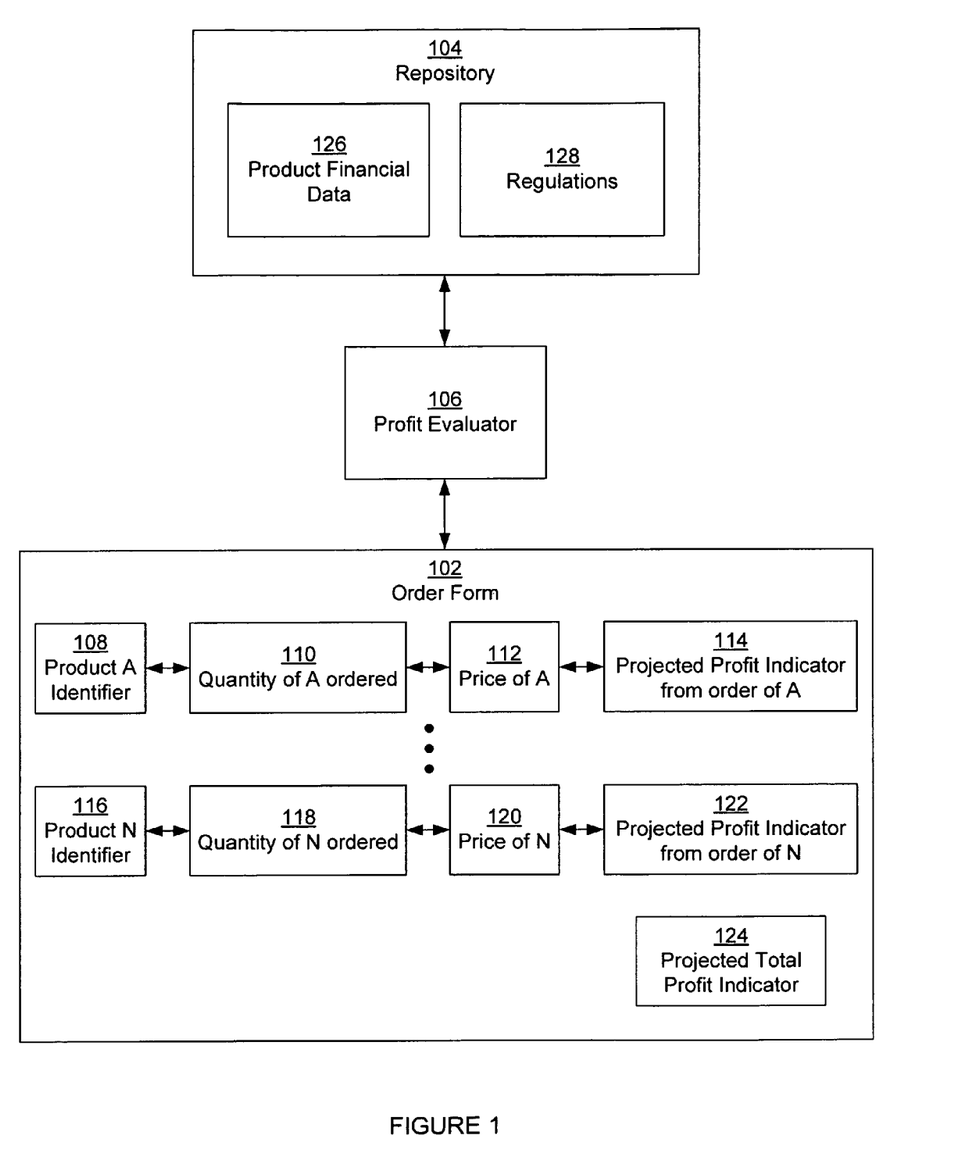
FIG. 1 shows a schematic diagram of a system for financially monitoring an order in accordance with one or more embodiments of the invention.

FIG. 1 shows a schematic diagram of a system for financially monitoring an order in accordance with one or more embodiments of the invention. As shown in FIG. 1, the system includes an order form (102), a repository (104), and a profit evaluator (106). Each of these components is described below.

An order form (102) corresponds to a form used to request a transaction for one or more products. Specifically, the order form (102) may be used by a salesperson or purchasing agent. When used by a salesperson, the order form allows the salesperson to enter a request for a product from a customer. When used by a purchasing agent, the order form allows the purchasing agent to request components of a product. In one or more embodiments of the invention, the order form corresponds to a computer-generated form, such as a graphical user interface, that has multiple fields. The fields of the order form may include a product identifier field (e.g., product A identifier (108), product N identifier (116)), a quantity ordered field (e.g., quantity of A ordered (110), quantity of N ordered (118)), and a price field (e.g., price of A field (112), price of N field (120)). Further, the order form may also include a projected profit indicator (e.g., projected profit indicator from order of A (114), projected profit indicator from order of N (122), projected total profit indicator (124)).

The product identifier field (e.g., product A identifier (108), product N identifier (116)) corresponds to a field that identifies the product to be ordered in accordance with one or more embodiments of the invention. Data stored in the product identifier field (e.g., product A identifier (108), product N identifier (116)) may correspond to any type of identification mechanism, such as product name, numerical identifier of the product, etc.

The quantity ordered field (e.g., quantity of A ordered (110), quantity of N ordered (118)) identifies an amount of the product to be ordered in accordance with one or more embodiments of the invention. The quantity of the product may have an effect on the price or the projected profit resulting from ordering the product. For example, by increasing the quantity a lower price may be offered. As another example, by increasing the quantity ordered, the amount of packaging to ship each individual product may decrease, thereby increasing the profitability from the transaction of the product.

The price field (e.g., price of A field (112), price of N field (120)) identifies the price of the product. The price may be determined by market research, manufacturer suggested retail price, the customer, etc. In one or more embodiments of the invention, the price field (e.g., price of A field (112), price of N field (120)) is modifiable. Specifically, a salesperson or purchase agent may adjust the price on the order form. For example, the salesperson may adjust the price to persuade a customer to buy a product. Similarly, a purchasing agent may change the price to modify an offer for a product or component thereof.

The projected profit indicator (e.g., projected profit indicator from order of A (114), projected profit indicator from order of N (122), projected total profit indicator (124)) identifies the projected profit from the transaction in accordance with one or more embodiments of the invention. A projected profit corresponds to the amount difference between the price of the goods sold and the cost in accordance with one or more embodiments of the invention. The costs may include variable costs, fixed costs, etc. The projected profit may correspond to a percentage, a monetary amount, etc. Specifically, the projected profit corresponds to any indication of the profitability of a product known in the art. For example, the projected profit may correspond to net profit, net profit margin, etc. The projected profit indicator (e.g., projected profit indicator from order of A (114), projected profit indicator from order of N (122), projected total profit indicator (124)) may correspond to an image (e.g., bar graph, pie chart, etc.), a number, etc.

In one or more embodiments of the invention, the order form (102) includes a projected profit indicator (e.g., projected profit indicator from order of A (114), projected profit indicator from order of N (122)) for each individual product on the order form (102) and a projected profit (e.g., projected total profit indicator (124)) indicator for the order. Thus, a user of the order form (102) (e.g., salesperson, purchasing agent, etc.) may identify the projected profit for each individual product and for the total order using the order form (102).

In addition to the order form (102), the system also includes a repository (104) in accordance with one or more embodiments of the invention. A repository (104) corresponds to a storage unit (e.g., database, file, file system, etc.) for data. The repository (104) includes product financial data (126) and regulations (128).

The product financial data (126) corresponds to data regarding the cost (i.e., fixed costs and variable costs), sale price, etc. of a product. Further, the product financial data (126) may be directly or indirectly associated with the product. For example, the product financial data (126) may include costs associated with raw materials, costs of buildings and equipment, etc. In addition, the product financial data (126) may also include costs and the real or estimated sale price of the product.

Alternatively, in or more embodiments of the invention, the product financial data (126) may include assumed fixed costs and/or prices for different products. Using the assumed fixed amount of the cost/price of a product, the projected profit is recalculated only once rather than for each time an individual item (i.e., of a product or a component thereof) is transacted.

In addition to the product financial data (126), the repository (104) includes predefined regulations (128) in accordance with one or more embodiments of the invention. Regulations (128) correspond to rules regarding which the profit margins are acceptable. Regulations (128) may be based on the consumer, the product, a component of a product, the order, etc. and may be implemented across the business entity and/or the department. Regulations may be internal and/or external. Internal regulations (128) correspond to regulations (128) that are stored in the repository (104). External regulations correspond to regulations that are identified and maintained by a particular user. For example, a regulation for a salesperson may state that the profit margin for a sale should result in a certain amount of commission for the salesperson.

Continuing with FIG. 1, the system also includes a profit evaluator (106). In one or more embodiments of the invention, the profit evaluator (106) corresponds to business logic that includes functionality to calculate the profit for each product in the order form (102). Specifically, the profit evaluator (106) corresponds to a business logic that can detect changes in the order form (102) and compute the profit for a product and the order based on the information in the order form (102) and the repository (104).

Figure 2:
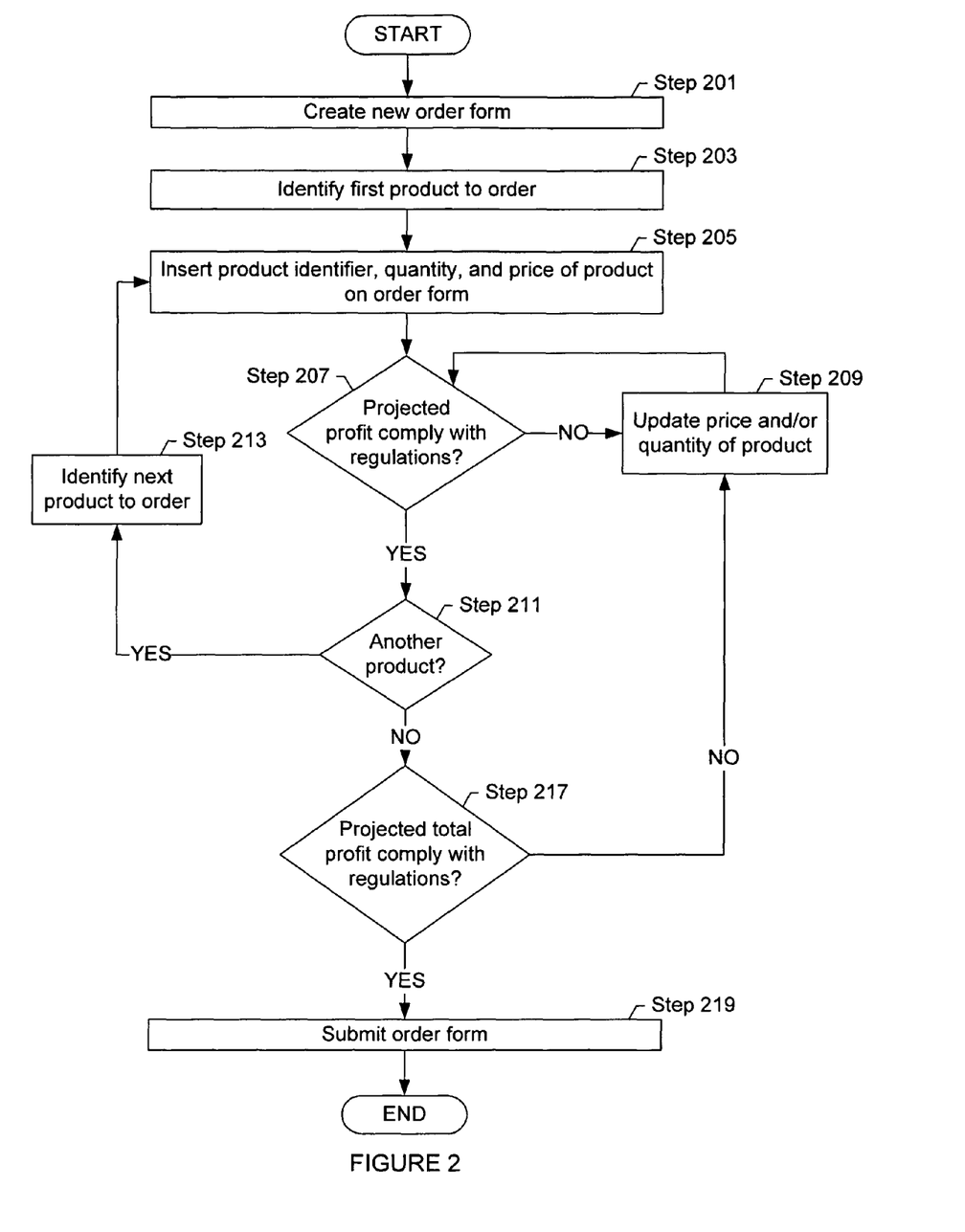
FIG. 2 shows a flowchart of a method for financially monitoring an order in accordance with one or more embodiments of the invention.

FIG. 2 shows a flowchart of a method for financially monitoring an order in accordance with one or more embodiments of the invention. Initially a new order form is created (Step 201). Specifically, a user, such as a salesperson, purchasing agent, or customer (i.e., the purchaser of the product), may create the new order form to initiate an order. Creating the new order form may involve accessing an Internet page, an application, etc. Also, at this stage, the user may provide address, shipping and billing information.

After initiating the new order, the first product of the order is identified (Step 203). Specifically, the customer identifies a good or service to be ordered. Once the first product is identified, then the product identifier, quantity, and the price of the product are added to the order form (Step 205). At this stage, the user may select a product and enter a quantity using any technique known in the art. The product identifier and quantity may be added to the order form. Also, at this stage, a price is entered into the order form. The first time a price is entered, the price is an initial price. Multiple mechanisms exist to enter the price. For example, the price may be entered by filling in a field, entered as a discount to a set price, etc.

After entering the product identifier and the price, the order form displays the projected profit indicator. Specifically, the projected profit is calculated (as described below in FIG. 3) and the projected profit indicator is displayed. The projected profit indicator may be displayed as a bar graph behind the price, a bar graph in a separate column, a number on the order form, etc.

Next, a determination is made whether the projected profit displayed on the order form complies with regulations (Step 207). The regulations may be internal or external to the user. For example, the user may have a personal regulation that all products he/she sells should have at least a 30% profit margin in order to protect his/her commission. The company may also have a regulation that the product identified should have 50% profit margin. Further, the regulation may or may not be stored in the repository. If the regulation is stored in a repository, than a visual or auditory warning signal may be outputted with the projected profit indicator to indicate that the projected profit does not comply with a regulation. For example, the projected profit indicator may be displayed while a beeping sound is played.

If the projected profit does not comply with regulations, then the price and/or quantity of the product may be updated (Step 209). Specifically, the user may set the quantity to zero and remove the product from the order, increase the quantity to decrease the price or increase the projected profit, or modify the price. For example, if the user is a purchasing agent, then the user may decrease the price to offer to a warehouse. If the user is a salesperson, then the user may increase the price to offer to the customer. Once the price and/or quantity is updated, the user may view an updated projected profit indicator that is updated on the order form. Thus, the user may determine whether the updated projected profit complies with regulations (Step 207). Alternatively, the user may completely ignore one or more regulations and continue ordering the product.

If the projected profit complies with regulations or if the regulations are ignored, then a determination is made whether another product is to be ordered (Step 211). If another product is to be ordered, then the next product is identified (Step 213). Accordingly, the process continues by inputting the product identifier, quantity, and price of the product on the order form (Step 205).

Once all products are on the order form, then the projected profit, then a determination is made whether the projected total profit complies with regulations (Step 217). Specifically, in one or more embodiments of the invention, the projected total profit for the order is displayed on the order form. The projected total profit may be displayed in a manner similar to displaying the projected profit for each product. After reviewing the projected total profit, the user may determine whether the projected total profit complies with internal or external regulations. Further, while one or more projected profits for products may not comply with regulations or may show that the transaction of the product is not profitable, the projected total profit may be profitable. In such scenario, the user may accept the projected total profit.

If the projected total profit does not comply with regulations, then the price and/or quantity of one or more products may be updated (Step 209). Thus, the method may repeat until the projected total profit complies with regulations. Alternatively, the user may ignore the regulations and finalize the order in accordance with one or more embodiments of the invention.

When the projected total profit complies with regulations, then the order form is submitted (Step 219). Submitting the order form may involve, for example, communicating with the opposing party of the transaction (e.g., customer, raw materials dealer, etc.) and waiting for approval. Further, the order form may be communicated to the opposing party with or without the projected profit indicator. Specifically, the projected profit indicator may be kept confidential to the user or business of the user. Further, the order may be finalized by performing the transaction defined by the order.

Figure 3:
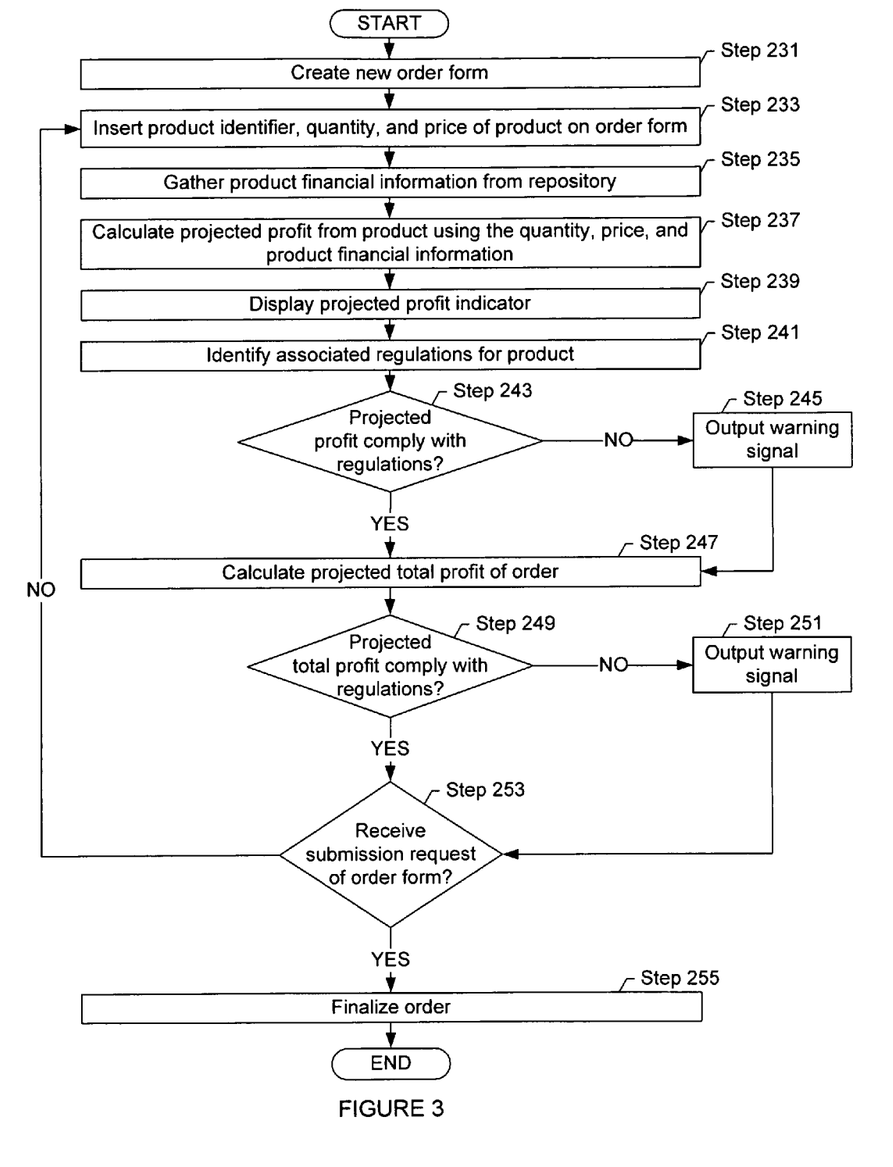
FIG. 3 shows a flowchart of a method for displaying profit information on an order form in accordance with one or more embodiments of the invention.

FIG. 3 shows a flowchart of a method for displaying profit information on an order form in accordance with one or more embodiments of the invention. Specifically, FIG. 3 shows a flowchart of a method to process a user's input on the order form. Initially, a new order form is created (Step 231). The order form may be created by initiating a new instance of a generic order form, populating an order form with default information, and/or any similar technique.

Once the order form is created, the product identifier, quantity, and price of the product are inserted on the order form (Step 233). Inserting the product identifier, quantity, and price of the product includes receiving a request from the user with the above information, storing the information, such as in a data structure with the order form, and associating the information with the order.

Next, the product financial information is gathered from the repository (Step 235). Gathering the product financial information may include, for example, obtaining the information from the repository using the product identifier.

The projected profit may then be calculated using the quantity, price, and product financial information (Step 237). Multiple mechanisms exist in accounting to calculate the profitability of a product. Any such mechanism may be used to identify the projected profit of each product. For example, if the order is for selling one or more products (e.g., the user is a salesperson selling to a customer), then the projected profit may be calculated by identifying the fixed and variable costs of the product. The cost may be defined as the costs at the time of the order or the costs at the time of purchase, etc. Once all of the costs are identified, then the costs may be summed to obtain the total cost for the product. Using the total cost and the price of the product, the projected profit from the product may be identified.

Alternatively, the total cost of the product may be estimated using historical information. For example, if the product is sold for multiple quarters, then the historical information for each quarter may be used to estimate the cost of the product for the current order. Thus, calculating the profitability may be performed using a single estimated cost, the current price of the product on the order form, and the quantity.

As another example, if the order is for purchasing a component of a product (e.g., a purchasing agent purchasing raw material from a warehouse), then the product financial information may correspond to assumed or actual costs for any remaining component (e.g., other raw materials), fixed costs for the product, and selling price of the product. Based on the costs for remaining components, the selling price of the product, and the current price of the component on the order form, the projected profit resulting from purchasing the component on the order form may be calculated.

Regardless of the method used to calculate the projected profit, the projected profit indicator is displayed on the order form (Step 239). In one or more embodiments of the invention, the projected profit indicator may include identifying a user preference for how the projected profit is to be displayed. Once the user preference is identified, the projected profit is outputted to the order form as denoted by the user preference.

Continuing with FIG. 3, the associated regulations for the product are identified (Step 241). Specifically, the repository may be queried for the regulations that correspond to the product identifier. Based on the regulations, a determination is made whether the projected profit complies with the regulations (Step 243). If the projected profit does not comply with the regulations, then a warning signal may be outputted (Step 245). Outputting a warning signal may include setting an auditory alarm, outputting an animation effect (e.g., flashing lights, 'marching ants', etc.), modifying the color of the displayed projected profit indicator, etc.

If the projected profit complies with regulations, or once the warning signal is outputted, then the projected total projected profit is calculated (Step 247). Calculating the projected total profit may include summing the projected profit for each product in the order form. Alternatively, the projected total profit may be calculated using the product financial information and calculating the projected total profit from scratch (Step 247).

Once the projected total profit is calculated, then a determination is made whether the projected total profit complies with regulations (Step 249). Specifically, regulations in the repository may require that the projected total profit for any order should be greater than 3%. If the projected total profit does not comply with regulations, then a warning signal may be outputted (Step 251). Outputting a warning signal may be performed as described above in step 245.

If the projected total profit complies with the regulations or after the warning signal is outputted, then a determination is made whether a submission request of the order form is received (Step 253). For example, a user may enter a submit button on the order form to indicate that the order should be processed. If the submission request of the order form is not received, then a request may be received for adding another product to the order form (Step 233).

Once a submission request is received, then the order may be finalized (Step 255). Finalizing the order may be performed using any technique known in the art and may be dependent on the type of order.

Figure 4A:
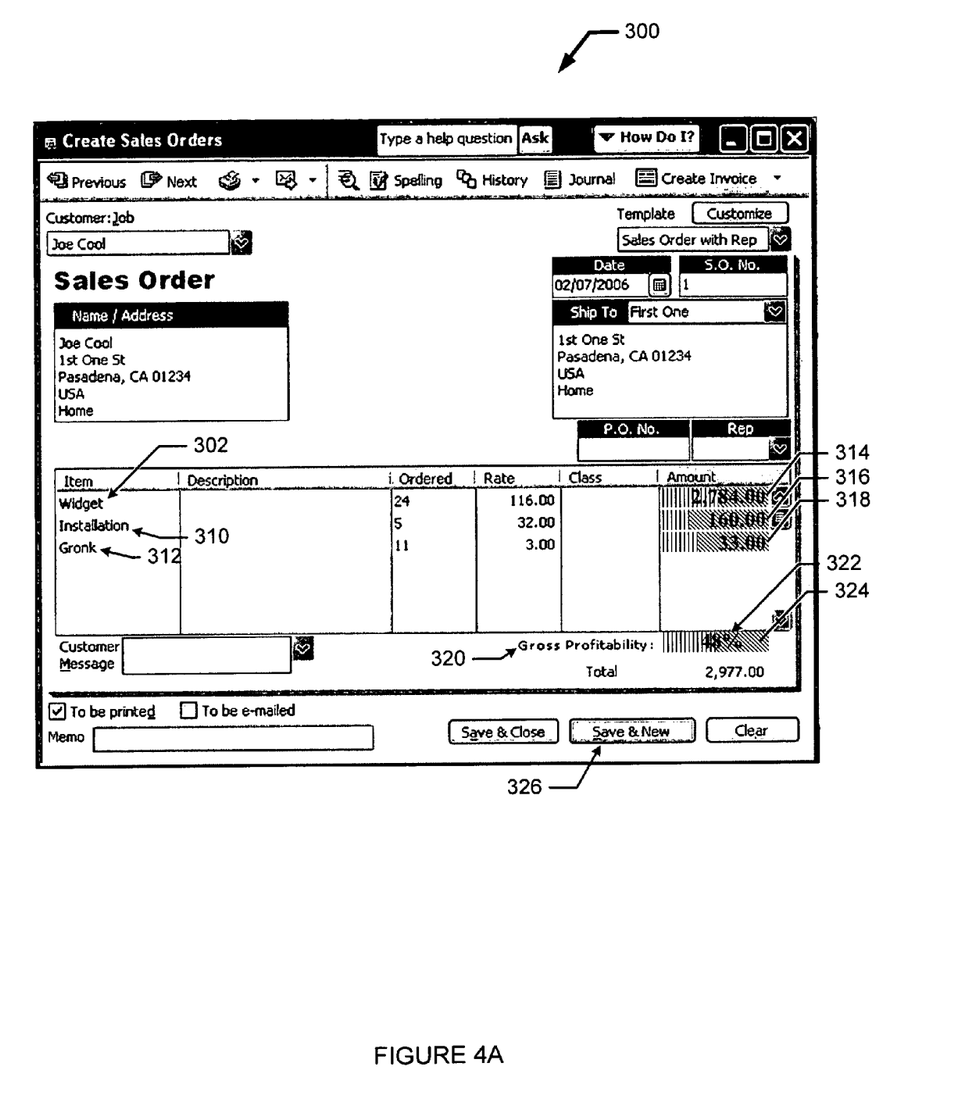
FIGS. 4A-4B shows examples of order forms for financial monitoring in accordance with one or more embodiments of the invention.
Figure 4B:
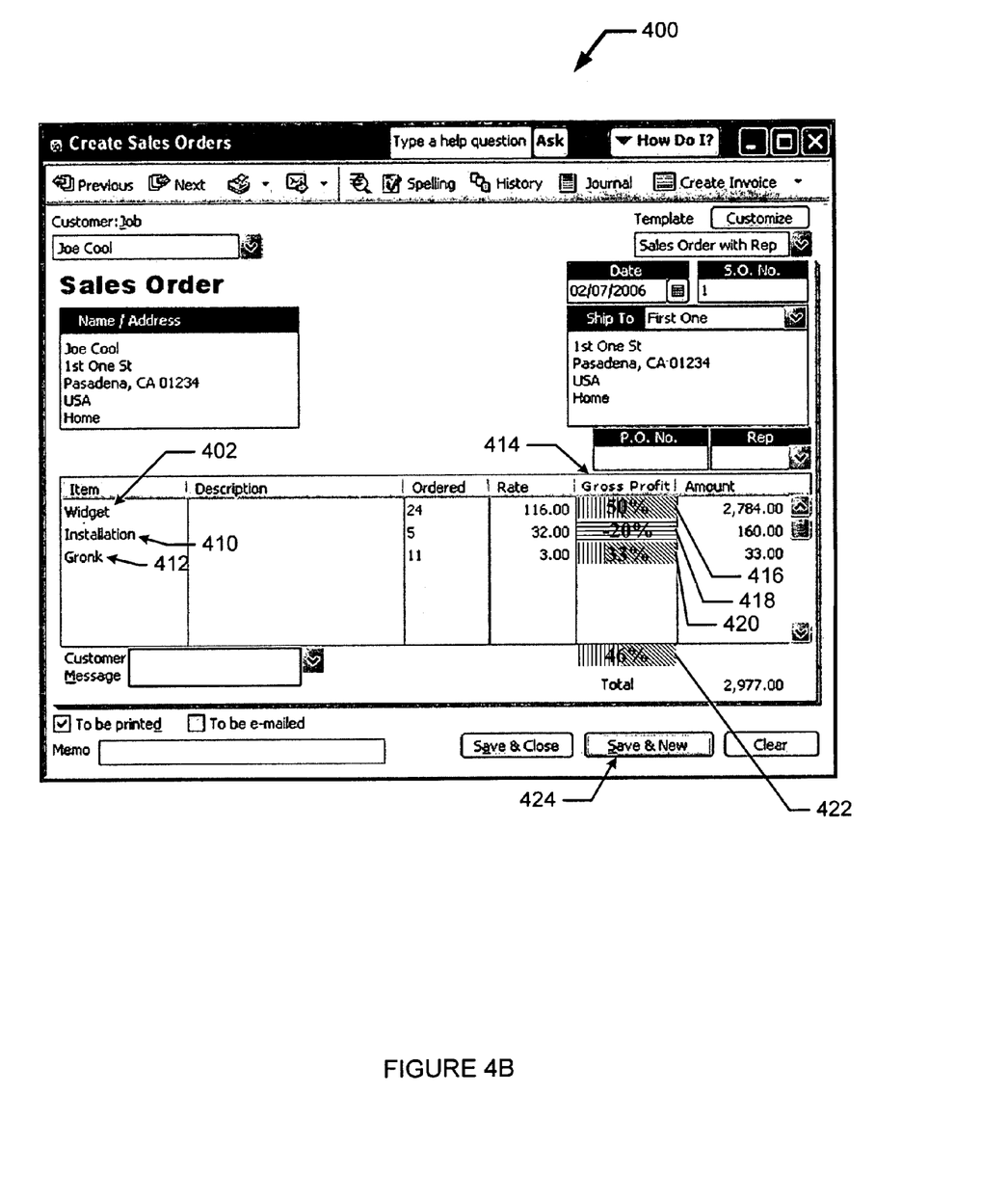

FIGS. 4A-4B shows examples of order forms for financial monitoring in accordance with one or more embodiments of the invention. FIG. 4A shows an example order form (300) in accordance with one or more embodiments of the invention. As shown in FIG. 4A, a user has populated the order form with the order of 24 widgets (302), 5 installations (310), and 11 gronks (312). Accordingly, for the 24 widgets (302), the product identifier is widget, the quantity (i.e., ordered column) is 24, and the initial price is $116.00 per widget. Thus, the total price the 24 widgets is $2,784.00 as shown in the amount column. Further, a projected profit indicator for the widget (314) is shown as a bar graph behind the total of the 24 widgets.

Similarly, for the 5 installations (310), the product identifier is installation, the quantity is 5, and the initial price is $32.00 per installation. Thus, the total price the 5 installations is $160.00 as shown in the amount column. Further, a projected profit indicator for the installation (316) is shown as a bar graph behind the total of the 5 installations.

Likewise, for the 11 gronks (312), the product identifier is gronk, the quantity is 11, and the initial price is $3.00 per gronk. Thus, the total price the 11 gronks is $33.00 as shown in the amount column. Further, a projected profit indicator for the gronk (318) is shown as a bar graph behind the total of the 11 gronks.

In addition to the projected profit indicator for each product, the example order form of FIG. 4A also shows a projected total profit (i.e., gross profitability (326)) for the order. The projected total profit, in the example, has two projected total profit indicators, a bar graph (324) and a numerical indicator (322). In this example, both projected total profit indicators indicate that the order has a 48% profitability.

Using the above example, consider the case in which a customer is in communication with a salesperson to place an order. Using the information provided by the projected profit indicators (e.g., 314, 316, 318, 322, 324), if a customer is not satisfied with the price, then the salesperson may decide to adjust the price of a product that currently has the highest profitability (i.e., widget). Specifically, the salesperson may decrease the price (i.e., rate) of the widget in order to maintain relations with the customer. As soon as the salesperson decreases the price on the order form, the salesperson may see an immediate change in the profitability indicators. If the revised profitability indicators complies with regulations, then the salesperson may offer the customer the updated price for the widget. If the revised profitability indicators do not conform with regulations, then the salesperson may revise the price or change the product before making an offer to the customer.

Once the customer and salesperson are pleased with the revised order form, then the sales person may use the save & new button (326) to finalize the current order and create a new order form.

As another example, FIG. 4B shows an order form (400) in which the projected profit indicator is maintained in a separate column (i.e., as gross profit (414)). As shown in FIG. 4B, a user orders 24 widgets (402) at $116.00, 5 installations at $32.00, and 11 gronks at $3.00. For this example, assume a salesperson is the user and the salesperson is talking to a customer to place the order.

When the salesperson inserts a widget, the quantity of widgets, and the price, on the order form (400), the profitability indicator for the widget (416) shows that selling the 24 widgets at $116.00 each is 50% profitable. Similarly, when the salesperson inserts a gronk, the quantity of gronks, and the price, on the order form (400), the profitability indicator for the gronk (418) shows that selling the 11 gronks at $3.00 each is 33% profitable.

However, when the salesperson inserts the installation, the quantity of installation, and the price, on the order form (400), the profitability indicator for the installation (420) shows that selling the 5 installations at $32.00 is −20% profitable. At this stage, the salesperson may adjust the price of the installation to ensure that the installation is also profitable. Alternatively, the salesperson may notice that the order form (400) also displays that the projected total profit (422) is 46%. Therefore, the salesperson may decide to take a loss on the installation in order to keep the customer. Once the customer approves of the order, the salesperson may use the save & new button (424) to finalize the order.

Figure 5:
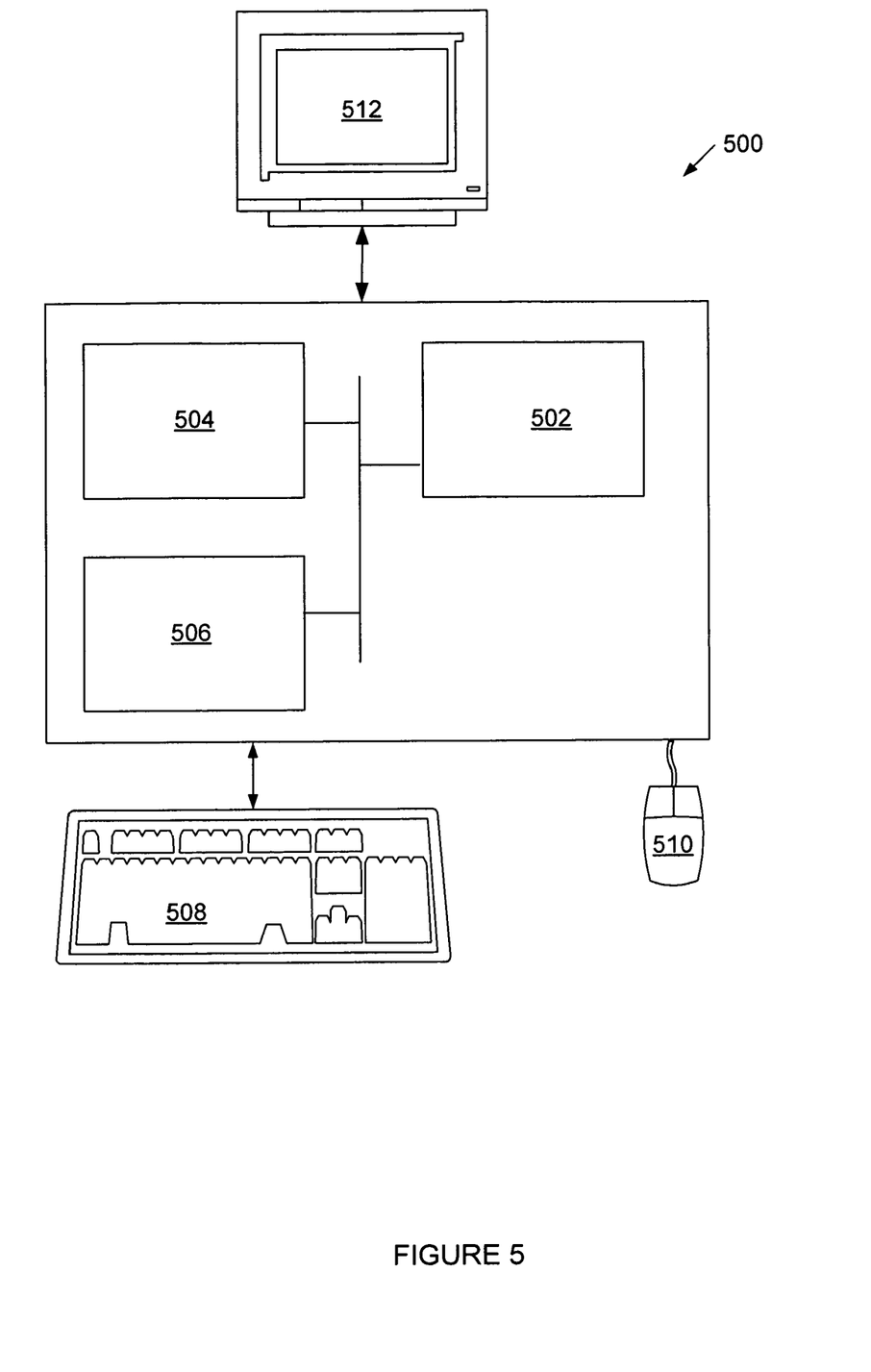
FIG. 5 shows a computer system in accordance with one or more embodiments of the invention.

The invention may be implemented on virtually any type of computer regardless of the platform being used. For example, as shown in FIG. 5, a computer system (500) includes a processor (502), associated memory (504), a storage device (506), and numerous other elements and functionalities typical of today's computers (not shown). The computer (500) may also include input means, such as a keyboard (508) and a mouse (510), and output means, such as a monitor (512). The computer system (500) is connected to a local area network (LAN) or a wide area network (e.g., the Internet) (not shown) via a network interface connection (not shown). Those skilled in the art will appreciate that these input and output means may take other forms.

Further, those skilled in the art will appreciate that one or more elements of the aforementioned computer system (500) may be located at a remote location and connected to the other elements over a network. Further, the invention may be implemented on a distributed system having a plurality of nodes, where each portion of the invention (e.g., repository, order form, profit evaluator, etc.) may be located on a different node within the distributed system. In one embodiment of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, a file, or any other computer readable storage device.

One or more embodiments of the invention provide a mechanism for a user to identify the profitability while creating an order. Specifically, by displaying the projected profit indicators on the order form as the order is created, a user can view the effects of their pricing decisions on the profitability of the order. Thus, for example, businesses may easily be able to assure that the salespeople and purchasing agents follow the regulations of the business.

Further, one or more embodiments of the invention allow the user to view the projected total profit of an order. Thus, a user can sacrifice the profit for one product while maintaining the total profit for the entire order. By giving the user access to more information, the user is able to make more accurate and beneficial decisions on each order.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for financially monitoring an order comprising:
   electronically, by a processor, inserting an initial price for each of a plurality of manufactured goods on an order form;
   electronically displaying an initial projected product profit indicator for each of the plurality of manufactured goods and an initial projected total profit indicator on the order form, wherein the initial projected product profit indicator is a graphical image that identifies an initial projected product profit, wherein the initial projected product profit is calculated for each of the plurality of manufactured goods using the initial price, and wherein the initial projected total profit indicator is a graphical image that identifies an initial projected total profit defining a total of the initial projected product profit of all of the plurality of manufactured goods;
   generating an initial total price from the initial price of each of the plurality of manufactured goods, wherein the initial total price is offered by a salesperson to a customer, and wherein the customer rejects the initial total price;
   receiving, from the salesperson, an adjustment of the initial price of a manufactured good of the plurality of manufactured goods resulting in a reduced price of the manufactured good displayed on the order form;
   electronically, by the processor, calculating a revised projected product profit for the manufactured good and a revised projected total profit for the plurality of manufactured goods based on the reduced price, wherein the revised projected product profit fails to comply with a predefined projected product profit regulation defining an acceptable product profit margin, and wherein the revised projected total profit complies with a predefined projected total profit regulation defining an acceptable total profit margin;
   electronically displaying, on the order form, a revised projected product profit indicator for the manufactured good and a revised projected total profit indicator for the revised projected total profit, wherein the revised projected product profit indicator is a graphical image that identifies the revised projected product profit of the manufactured good, and wherein the revised projected total profit indicator is a graphical image that identifies the revised projected total profit defining a total of the revised projected product profit and the initial projected product profit of the plurality of manufactured goods;
   generating, on the order form, a revised total price from the reduced price, wherein the revised total price is offered by the salesperson to the customer; and
   electronically submitting the order form to initiate the order of the plurality of manufactured goods upon acceptance of the revised total price by the customer.

2. The method of claim 1, wherein the initial projected product profit indicator and the initial projected total profit indicator are each a bar graph.

3. The method of claim 2, wherein the initial price of each of the plurality of manufactured goods overlaps with each of the corresponding bar graphs such that the initial price of each of the plurality of manufactured goods and each of the corresponding bar graphs are simultaneously viewable on the order form.

4. The method of claim 2, wherein each of the bar graphs is displayed in a profit column on the order form.

5. The method of claim 1, wherein the initial projected product profit indicator indicates net profit.

6. The method of claim 1, wherein the initial projected product profit indicator comprises a warning signal when the initial projected product profit does not comply with the predefined projected product profit regulation.

7. The method of claim 1, wherein calculating the initial projected product profit uses a cost associated with each of the plurality of manufactured goods.

8. The method of claim 7, wherein the cost accounts for a purchase price of each of a plurality of components required to create each of the plurality of manufactured goods.

9. The method of claim 2, wherein each of the bar graphs consists of a first bar representing a percentage of the initial price covering costs of the manufactured good and a second bar representing a profit of the manufactured good as a percentage of the initial price.

10. The method of claim 9, wherein the first bar and the second bar are collinear.

11. The method of claim 1, wherein a numerical indicator of the revised projected product profit and the revised projected total profit is displayed on the order form with the revised projected product profit indicator and the revised projected total profit indicator.

12. A computer system for financially monitoring an order comprising:
   a processor;
   a memory; and
   software instructions stored in memory for causing the processor to:
      receive an initial price for each of a plurality of manufactured goods on an order form;
      calculate an initial projected product profit for each of the plurality of manufactured goods using the initial price;
      display an initial projected product profit indicator for each of the plurality of manufactured goods and an initial projected total profit indicator, wherein the initial projected product profit indicator identifies the initial projected product profit and wherein the initial projected total profit indicator is a graphical image that identifies an initial projected total profit defining a total of the initial projected product profit of all of the plurality of manufactured goods;
      display an initial total price from the initial price of each of the plurality of manufactured goods, wherein the initial total price is offered by a salesperson to a customer, and wherein the customer rejects the total price;
      receive, from the salesperson, an adjustment of the initial price of a manufactured good of the plurality of manufactured goods resulting in a reduced price of the manufactured good on the order form;
      calculate a revised projected product profit for the manufactured good and a revised projected total profit for the plurality of manufactured goods based on the reduced price, wherein the revised projected product profit complies with a predefined projected product profit regulation defining an acceptable product profit margin, and wherein the revised projected total profit complies with a predefined projected total profit regulation defining the acceptable total profit margin;
      display a revised projected product profit indicator for the manufactured good and a revised projected total profit indicator for the revised projected total profit, wherein the revised projected product profit indicator is a graphical image that identifies the revised projected product profit of the manufactured good, and wherein the revised projected total profit indicator is a graphical image that identifies the revised projected total profit defining a total of the revised projected product profit and the initial projected product profit of the plurality of manufactured goods; and
      display a revised total price on the order form based on the reduced price, wherein the revised total price is offered by the salesperson to the customer,
   wherein the order form is submitted to initiate the order of the plurality of manufactured goods upon acceptance of the revised total price by the customer.

13. The computer system of claim 12, wherein the initial projected product profit indicator is a bar graph.

14. The computer system of claim 13, wherein the initial price overlaps with the bar graph such that the initial price and the bar graph are simultaneously viewable when the bar graph is displayed on the order form.

15. The computer system of claim 13, wherein the bar graph is displayed in a profit column on the order form.

16. The computer system of claim 12, wherein the initial projected product profit indicator indicates net profit.

17. The computer system of claim 12, wherein the initial projected product profit indicator comprises a warning signal when the initial projected product profit does not comply with the predefined projected product profit regulation.

18. The computer system of claim 12, wherein calculating the initial projected product profit uses a cost associated with each of the plurality of manufactured goods.

19. The computer system of claim 12, wherein the software instructions stored in memory further cause the processor to:
   display, on the order form, a numerical indicator of the revised projected product profit and the revised projected total profit with the revised projected product profit indicator and the revised projected total profit indicator.

20. A computer readable medium comprising computer readable program code embodied thereon for causing a processor to:
   insert an initial price for each of a plurality of manufactured goods on an order form;
   display an initial projected product profit indicator for each of the plurality of manufactured goods and an initial projected total profit indicator on the order form, wherein the initial projected product profit indicator identifies an initial projected product profit, wherein the initial projected product profit is calculated for each of the plurality of manufactured goods using the initial price, and wherein an initial projected total profit indicator is a graphical image that identifies an initial projected total profit defining a total of the initial projected product profit of all of the plurality of manufactured goods;
   generate an initial total price from the initial price of each of the plurality of manufactured goods, wherein the initial total price is offered by a salesperson to a customer, and wherein the customer rejects the initial total price;
   receive, from the salesperson, an adjustment of the initial price of a manufactured good of the plurality of manufactured goods resulting in a reduced price of the manufactured good displayed on the order form;
   calculate a revised projected product profit for the manufactured good and a revised projected total profit for the plurality of manufactured goods based on the reduced price, wherein the revised projected product profit fails to comply with a predefined projected product profit regulation defining an acceptable product profit margin, and wherein the revised projected total profit complies with a predefined projected total profit regulation defining the acceptable total profit margin;

electronically display, on the order form, a revised projected product profit indicator for the manufactured good and a revised projected total profit indicator for the revised projected total profit, wherein the revised projected product profit indicator is a graphical image that identifies the revised projected product profit of the manufactured good, and wherein the revised projected total profit indicator is a graphical image that identifies the revised projected total profit defining a total of the revised projected product profit and the initial projected product profit of the plurality of manufactured goods;

generate, on the order form, a revised total price from the reduced price, wherein the revised total price is offered by the salesperson to the customer; and submit the order form to initiate an order for the plurality of manufactured goods upon acceptance of the revised total price by the customer.

21. A method for financially monitoring an order comprising:

electronically, by a processor, inserting an initial price of a component of a plurality of components of a manufactured good on an order form;

electronically displaying an initial projected profit indicator on the order form, wherein the initial projected profit indicator is a graphical image that identifies an initial projected profit, wherein the initial projected profit is calculated for the manufactured good based on a sales price of the manufactured good and the initial price of each of the plurality of components of the manufactured good, and wherein the initial projected profit fails to comply with a predefined projected regulation defining an acceptable profit margin for the manufactured good;

receiving an adjustment of the initial price of the component resulting in a reduced price of the component displayed on the order form;

electronically, by the processor, calculating a revised projected profit based on the reduced price;

electronically displaying, on the order form, a revised projected profit indicator for the manufactured good, wherein the revised projected profit indicator is a graphical image that identifies the revised projected profit of the manufactured good; and electronically submitting the order form to initiate the order of the component at the reduced price when the revised projected profit complies with the predefined projected profit regulation.

22. The method of claim 21, wherein the component is a raw material from which manufactured good is created.

* * * * *